(12) United States Patent
Kono et al.

(10) Patent No.: US 9,383,147 B2
(45) Date of Patent: Jul. 5, 2016

(54) COOLANT SUPPLY APPARATUS

(75) Inventors: Kazumasa Kono, Aiko-gun (JP);
Toshihiro Suzuki, Aiko-gun (JP);
Takeshi Kawada, Aiko-gun (JP);
Muneo Takahashi, Aiko-gun (JP);
Hideaki Suehiro, Aiko-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 147 days.

(21) Appl. No.: 14/344,792

(22) PCT Filed: Sep. 16, 2011

(86) PCT No.: PCT/JP2011/071282
§ 371 (c)(1),
(2), (4) Date: Mar. 13, 2014

(87) PCT Pub. No.: WO2013/038567
PCT Pub. Date: Mar. 21, 2013

(65) Prior Publication Data
US 2014/0338765 A1    Nov. 20, 2014

(51) Int. Cl.
*B01D 47/06*    (2006.01)
*F28F 27/02*    (2006.01)
*B23Q 11/00*    (2006.01)
*B23Q 11/10*    (2006.01)

(52) U.S. Cl.
CPC .............. *F28F 27/02* (2013.01); *B23Q 11/005* (2013.01); *B23Q 11/10* (2013.01); *Y02P 70/171* (2015.11); *Y10T 137/86027* (2015.04)

(58) Field of Classification Search
CPC .... B23Q 11/10; B23Q 11/005; Y02P 70/167; Y02P 70/169; Y02P 70/171
USPC ..................................................... 137/565.17
See application file for complete search history.

(56) References Cited

U.S. PATENT DOCUMENTS

| 6,241,432 B1 | 6/2001 | Sasanecki |
| 6,884,009 B2 | 4/2005 | Maeda |
| 2008/0295540 A1 | 12/2008 | Kunz et al. |

FOREIGN PATENT DOCUMENTS

| DE | 202011052170 U1 * | 3/2013 | ......... B23Q 11/1038 |
| JP | 62-34751 | 2/1987 | |
| JP | 7-127565 | 5/1995 | |
| JP | 2003-94280 | 1/2003 | |

(Continued)

OTHER PUBLICATIONS

Brinkmann, Translation of DE202011052170U1, Mar. 4, 2013, 4 pages.*

(Continued)

*Primary Examiner* — Kevin Lee
*Assistant Examiner* — P. Macade Nichols
(74) *Attorney, Agent, or Firm* — Morrison & Foerster LLP

(57) ABSTRACT

A coolant supply apparatus includes variable delivery coolant pump (100) pumping up coolant from coolant tank (104), a plurality of branch passages (120 to 124) allowing coolant (108) delivered from coolant pump (100) to flow separately to a plurality of parts of a machine tool, and machine control unit (110) turning on and off on-off valves (136) of the plurality of branch passages (120 to 124), wherein machine control unit (110), in response to a jet coolant instruction, opens only one branch passage to intensively supply coolant (108) to the branch passage at the maximum delivery rate of coolant pump (100) and closes the other branch passages.

4 Claims, 3 Drawing Sheets

(56) References Cited

FOREIGN PATENT DOCUMENTS

| | | |
|---|---|---|
| JP | 2003-94280 | 4/2003 |
| JP | 2003-159633 | 6/2003 |
| JP | 2005-271088 | 10/2005 |
| JP | 2007-30109 | 2/2007 |
| JP | 2008-528303 | 7/2008 |

OTHER PUBLICATIONS

International Search Report and Written Opinion mailed Nov. 22, 2011, directed to International Application No. PCT/JP2011/071282; 2 pages.

Extended Search Report mailed Apr. 10, 2015, directed to European Application No. 11872295.8, 5 pages.

\* cited by examiner

COOLANT SUPPLY APPARATUS

REFERENCE TO RELATED APPLICATIONS

This application is the national stage application under 35 USC 371 of International Application No. PCT/JP2011/071282, filed Sep. 16, 2011, the entire contents of which are incorporated by reference.

FIELD OF THE INVENTION

The present invention relates to a coolant supply apparatus for supplying coolant to parts of a machine tool.

BACKGROUND OF THE INVENTION

Coolants have the effects of cooling, lubricating and removing chips, and are used as cutting fluids or grinding fluids in cutting and grinding processes. Coolants work as follows: the cooling effect absorbs friction heat and heat of metals generated between a workpiece and a tool or between a tool and chips, and cools the workpiece, tool, and other components of a machine tool; the lubricating effect reduces friction between a workpiece and a tool or a tool and chips by coolant flowing between the workpiece and the tool or the tool and the chips, thereby preventing generation of a built-up edge and welding of chips onto a tool cutting face; and the chip removing effect is achieved by coolant jetted with a given pressure and a given flow rate removing chips from a processing point and controlling the direction in which chips are removed, forcing chips to drop off the top surface of a workpiece, or forcing chips in a trough to flow in a specified direction. While coolant may be jetted by any pressure such as a pressure as high as 7 MPa or higher.

Coolants can be jetted to a processing point in various ways. The pressure of coolant, the flow rate of coolant, the temperature of coolant, jet duration, an jet position, and other parameters are determined according to a process mode, and a suitable coolant supply apparatus as a coolant jet is used. Patent Literature 1 discloses a coolant pumping apparatus used for a coolant supply apparatus and Patent Literature 2 discloses a coolant supply apparatus.

Patent Literature 1 discloses a coolant pumping apparatus including an inverter device and discloses that the rotation speed of the electric motor is made variable by an inverter control to supply required amounts of coolant to a plurality of processing positions, thereby minimizing wasteful jet of coolant to reduce power loss.

Patent Literature 2 discloses the use of an ON timer and an OFF timer that turn on and off at least one on-off valve provided for each branch passage to control the amounts of a coolant supplied to a plurality of washing positions.

PLT 1: Japanese Unexamined Patent Publication (Kokai) No. 07-127565

PLT 2: Japanese Unexamined Patent Publication (Kokai) No. 2007-30109

SUMMARY OF THE INVENTION

Using a common pump can make the size of a machine tool compact without increasing the complexity of the structure of the machine tool and can reduce manufacturing cost. On the other hand, when coolant is supplied simultaneously to a plurality of parts of the machine tool by using a common pump, the flow rate of coolant flowing through individual passages decreases. In other words, a coolant supply apparatus that uses a common pump for supplying coolant to a plurality of parts of a machine tool creates results in increasing the number of jet nozzles, the jet rate of coolant jetted from each individual jet nozzle decreases, so that the chip removing effect of the coolant becomes insufficient. For example, when coolant is supplied to a spindle nozzle coolant passage provided for a spindle head of a machine tool, a shower coolant passage provided on the ceiling or on an upper part of a wall of a working chamber, and a trough coolant passage provided at the base of the working chamber and jetted simultaneously through jet nozzles provided at ends of the individual coolant passages, the amount of coolant supplied to the spindle nozzle coolant passage becomes relatively small and therefore, removal of chips from the processing point can be insufficient. In the shower coolant passage, removal of chips from the top surface of a workpiece can be insufficient and the tool can interfere in chips left unremoved at the interface between a tool and a workpiece in the subsequent process, and the cutting edge of the tool can be damaged or chips left can scratch a finished surface of the workpiece to leave a scratch on the finished surface. Furthermore, in the trough coolant passage, chips that drop into the trough provided at the base of the working chamber can accumulate in the trough without flowing out of the working chamber. Using a large pump to solve the problem also increases the size of the machine tool.

An object of the present invention is to provide a coolant supply apparatus that uses a common pump wherein the coolant supply apparatus does not require the size of a pump to be increased, yet is capable of reliably removing chips from a working chamber by jetting coolant without leaving chips on any of a workpiece, a table, a cover, and a trough.

To achieve the above objects, the present invention provides a coolant supply apparatus supplying coolant to parts of a machine tool. The coolant supply apparatus includes a coolant pump delivering coolant from a coolant tank, amount of the coolant to be delivered being variable, a plurality of branch passages allowing coolant delivered from the coolant pump to flow separately to a plurality of parts of the machine tool, and control means for turning on and off on-off valves of the plurality of branch passages, wherein the control means, in response to a jet coolant instruction, opens a particular branch passage to supply coolant intensively to the particular branch passage with a preset delivery rate of the coolant pump and closes the other branch passages.

Thus, according to the present invention, coolant delivered from the coolant pump with a preset flow rate, for example the maximum delivery rate of the coolant pump, can be intensively supplied only to a particular branch passage in response to a jet coolant instruction even though the coolant pump is a common coolant pump.

Coolant is jetted from each jet nozzle provided at end of each branch passage in turn with the preset delivery rate for a predetermined period of time, thereby chips can be reliably removed from a processing point and a workpiece, and chips that dropped in the trough provided at the base of the working chamber can be removed out of the working chamber by the coolant with the preset delivery rate. This can prevent damage to a tool and a workpiece due to chip biting or the like and can reliably jet chips accumulated in the trough in the working chamber out of the working chamber. Note that chips removed from the working chamber are automatically removed from the machine by a mechanical lift-up chip conveyer or the like.

The present invention further provides a coolant supply apparatus in which a plurality of branch passages include at least a shower coolant passage and a trough coolant passage.

Thus, according to the present invention, coolant delivered from the coolant pump with the preset delivery rate is intensively supplied only to a passage at an upper part of the working chamber, for example the shower coolant passage, for a predetermined period of time to jet the coolant from nozzles, then coolant with the preset delivery rate is intensively supplied only to a passage at the bottom of the working chamber, for example a trough coolant chamber, for a predetermined period of time to jet the coolant from nozzles, thereby coolant can be supplied to each branch passage with a flow rate greater than a flow rate with which coolant is usually supplied to the branch passage to reliably force chips to drop in the trough without leaving chips on a workpiece and then jet chips in the trough to the lift-up chip conveyer outside the working chamber.

BRIEF DESCRIPTION OF THE DRAWINGS

The above and other objects, features and advantages of the present invention will be more apparent from the following description of preferred embodiments taken in connection with the accompanying drawings in which.

DETAILED DESCRIPTION OF THE INVENTION

Examples of the embodiments of the present invention will be described below in detail with reference to the drawings.

Figure 1:
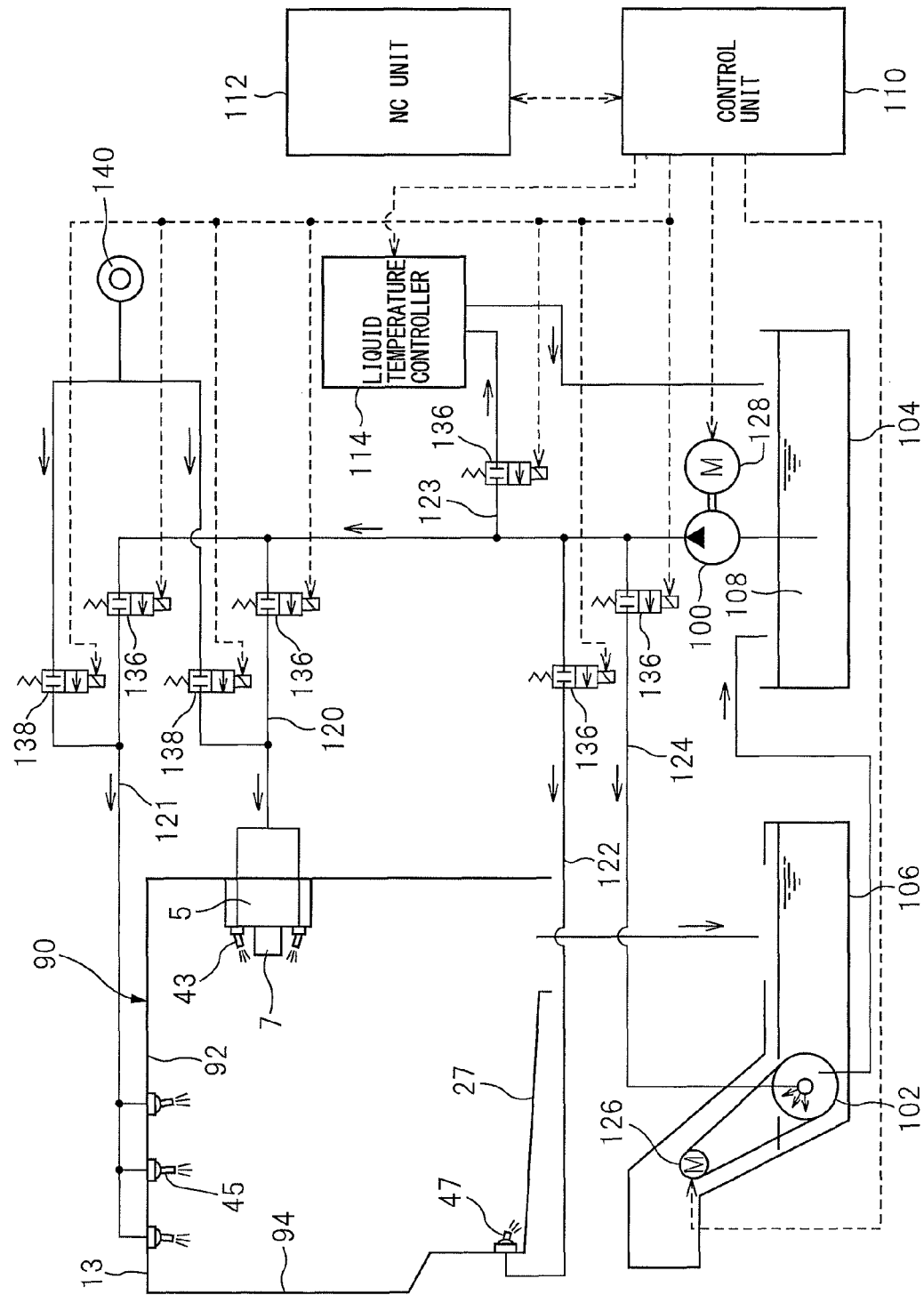
FIG. 1 illustrates a coolant supplying circuit of a coolant supply apparatus according to the present invention.

FIG. 1 illustrates a coolant supply circuit of a coolant supply apparatus of the present embodiment. The coolant supply apparatus is provided for machining center 90 and is capable of supplying coolant 108 pumped up from clean tank 104 using common pump 100 to a plurality of coolant passages (branch passages) 120 to 124. Coolant 108 collected together with chips is filtered with drum filter 102, and is then recycled. Note that chips removed by coolant 108 are collected in debris tank 106 and are removed to a predetermined place with a scraper (not shown) of a lift-up chip conveyer going around in a circle in dirty tank 106. The mechanical lift-up chip conveyer is provided as peripheral equipment of machining center 90.

As illustrated in FIG. 1, the coolant supply apparatus of the present embodiment includes variable delivery coolant pump 100 pumping up collected and filtered coolant 108 from clean tank 104, a plurality of coolant passages 120 to 124 which allow coolant 108 delivered from pump 100 to flow separately to a plurality of positions in machining center 90, and machine control unit 110 (control means) 110 which controls on-off valves 136, 138 closing and opening the plurality of coolant passages 120 to 124 and which, in response to a jet coolant instruction in M code from NC unit 112 of machining center 90, opens only a particular coolant passage to supply coolant 108 intensively to that passage with a preset delivery rate of coolant pump 100 (which, in this embodiment, is the maximum delivery rate of coolant pump 100) and closes the other coolant passages. This enables jet coolant supply with the maximum delivery rate of pump 100 to only a particular passage, in addition to normal coolant supply in which the plurality of coolant passages 120 to 124 are opened simultaneously.

The branch passages of the present invention are not pipelines, for example, that branch to a plurality of spindle nozzles 43 and a plurality of shower nozzles 45 in spindle nozzle coolant passage 120 and shower coolant passage 121 but instead are coolant passages that separate a flow of coolant 108 into a plurality of functional streams such as spindle nozzle coolant, shower coolant, trough coolant, a filter backwash coolant, and liquid temperature control coolant. Each of on-off valves 136 is provided at the root of each branch passage. Note that on-off valves 138 are valves for blasting and stopping of air, which will be described later.

A particular coolant passage that is opened in response to a jet coolant instruction may be a single coolant passage or a combination of a plurality of coolant passages, for example, the combination of spindle nozzle coolant passage 120 and shower coolant passage 121, which are the coolant passages provided at an upper part of the working chamber. The coolant passages at the bottom of the working chamber may include, in addition to trough coolant passage 122, a terrace coolant passage which solely jet away chips that would otherwise accumulate on a level surface or an inclined surface formed inside a splash guard and a table coolant passage which solely jet away chips that would otherwise accumulate on the top surface of table 11.

The plurality of coolant passages 120 to 124 of the present embodiment include nozzle coolant passage 120 which supplies coolant 108 to spindle nozzles 43 provided at spindle head 5 which holds a cutting tool, shower coolant passage 121 which supplies coolant 108 to ceiling 92 and side surface 94 of the working chamber enclosed with splash guard 13 of machining center 90, trough coolant passage 122 which supplies coolant 108 to elongated trough 27 which is provided at bed 1 of machining center 90 and has an angular U-shaped cross section, liquid temperature control coolant passage 123 supplying coolant 108 to liquid temperature controller 114 which controls the temperature of filtered coolant 108 in clean tank 104 to keep the temperature constant, and filter backwash coolant passage 124 supplying coolant 108 to backwash nozzles provided inside drum filter 102 which filters coolant 108 collected in dirty tank 106 with chips in order to wash out clogging of drum filter 102. Since liquid temperature control coolant passage 123 does not supply jet coolant, jet coolant supply is selectively performed in spindle nozzle coolant passage 120, shower coolant passage 121, trough coolant passage 122, and filter backwash coolant passage 124.

Liquid temperature controller 114 controls and keeps the temperature of coolant 108 constant in order to increase the accuracy of dimensions of a processed product. While liquid temperature controller 114 is provided as peripheral equipment of the coolant supply apparatus, liquid temperature controller 114 may be included in the coolant supply apparatus. Drum filter 102 provided with filter backwash coolant passage 124 supplying coolant 108 to the backwash nozzles inside drum filter 102 is cleaned with coolant 108 while being rotated by driving by motor 126 which is controlled by machine control unit 110.

Spindle nozzle coolant passage 120, shower coolant passage 121 and trough coolant passage 122 have at least one spindle nozzle 43, shower nozzle 45 and trough nozzle 47, respectively, at those ends and coolant 108 is jetted from the jet nozzles with a predetermined pressure. The timing of jet of coolant 108 from the jet nozzle(s) provided for each coolant passage can be determined in accordance with a process program. For example, from spindle nozzles 43, coolant may be jetted constantly during a process and, after the end of the process, coolant 108 may be jetted as necessary; from shower nozzle 45, coolant 108 may be constantly or intermittently jetted during a process and, in an early period after the end of the process, coolant 108 may be jetted; from trough nozzle 47, coolant 108 may be constantly jetted during a process and, after the end of the process, coolant 108 may be jetted for a certain period of time. Jet coolant supply can be performed only in a particular coolant passage among the plurality of coolant passages in response to a jet coolant instruction and a coolant passage in which jet coolant supply is to be performed is determined in accordance with a process mode. In accordance with a process mode, after the end of the process, coolant 108 may be jetted first only into spindle nozzle coolant passage 120 for a predetermined period of time, then coolant 108 may be supplied into shower coolant passage 121 for a predetermined period of time to force chips on a workpiece 19, angle plate 17, and pallet 15 and chips attached to inner walls of splash guard 13 and covers 37, 39 to drop in the trough 27. Afterwards, coolant 108 may be supplied into trough coolant passage 122 for a predetermined period of time to jet chips in trough 27 away from the working chamber. Coolant 108 is supplied from spindle nozzle coolant passage 120 and shower coolant passage 121 provided at the upper part of the working chamber, then coolant 108 is supplied from trough coolant passage 122 provided at the lower part of the working chamber, so that chips are eliminated from the working chamber as much as possible.

One example of variable delivery coolant pump 100 may be pump 100 equipped with inverter motor 128. While an inverter circuit which converts DC power to AC power and changes the delivery rate of coolant pump 100 is included in machine tool, the inverter circuit may be provided separately from machine control unit 110. By using variable delivery coolant pump 100, coolant 108 can be supplied at a low delivery rate during normal coolant supply, thereby power loss can be reduced. While inverter-controlled variable delivery coolant pump 100 of any specifications may be used, coolant pump 100 with the maximum delivery rate of 0.3 $m^3$/min, for example, may be used. When this pump 100 is used to supply coolant 108 in a normal manner to a plurality of open coolant passages simultaneously, the flow rates in the coolant passages are as follows: 0.06 $m^3$/min in spindle nozzle coolant passage 120, 0.08 $m^3$/min in shower coolant passage 121, 0.08 $m^3$/min in trough coolant passage 122, 0.04 $m^3$/min in liquid temperature coolant passage 123, and 0.04 $m^3$/min in filter backwash coolant passage 124. When coolant 108 is supplied only normally to spindle nozzle coolant passage 120 and trough coolant passage 123, coolant pump 100 is operated at a delivery rate of 0.14 $m^3$/min. According to the configuration of the present invention, when only a particular coolant passage is opened and coolant 108 is supplied into the coolant passage, coolant 108 can be supplied only to the open coolant passage at the maximum delivery rate of pump 100, i.e., 0.3 $m^3$/min.

Coolant pump 100 is chosen so that it has a maximum rate that is equal to or greater than the total of flow rates at which coolant is normally supplied simultaneously and that satisfies the highest value of the flow rates needed for each coolant passage to remove chips for which it is responsible. Coolant pump 100 with the maximum delivery rate of 0.3 $m^3$/min has been chosen in the present embodiment because the total of flow rates at which coolant is to be supplied simultaneously is normally 0.3 $m^3$/min, the passage that requires the highest flow rate is trough coolant passage 122 when coolant passages are opened one after another to remove chips, and a flow rate of 0.3 $m^3$/min is high enough to reliably remove chips that would accumulate in trough 27.

When the flow rate necessary to reliably remove chips accumulated in trough 27 is estimated to be 0.5 $m^3$/min, coolant pump 100 with a maximum delivery rate of 0.5 $m^3$/min needs to be chosen.

While the maximum delivery rate of coolant pump 100 is used as the preset delivery rate for coolant pump 100 for responding to a jet coolant instruction, other delivery rate, for example 0.27 $m^3$/min may be used. What is important is that the delivery rate of coolant pump 100 be such that when coolant 108 is supplied only to each coolant passage among the coolant passages, coolant 108 is supplied at a flow rate greater than a flow rate with which coolant 108 is normally supplied to the coolant passage.

While the on-off valves used are solenoid valves 136, 138 that are turned on and off by machine control unit 110 which receives M code instructions from NC unit 112, air-operated valves which are operated with compressed air or electric-operated valves which are driven by a motor may be used. In the present embodiment, as is illustrated in FIG. 1, normally-closed 2-port solenoid valves 136, 138 which are closed when the solenoids are de-energized and opened when energized are provided in the coolant passages. Among solenoid valves 136, 138, solenoid valves 136 open in response to code instruction M08 and close in response to code instruction M09 in normal coolant supply. Only one of solenoid valves 136 provided for spindle nozzle coolant passage 120, shower coolant passage 121 and trough coolant passage 122 is opened to jet coolant in response to predetermined M code instruction and is closed to stop the jet coolant supply after a lapse of a predetermined period of time set with a timer. While solenoid valves 136 provided for backwash coolant passage 124 and liquid temperature control coolant passage 123 are also opened and closed by machine control unit 110 in the present embodiment, hard switches may be provided to open and close solenoid valves 136.

Two solenoid valves 136, 138 are provided in parallel for each of spindle nozzle coolant passage 120 and shower coolant passage 121, and push-out air supplied from pressure source 140 can be blasted in order to prevent the dropping of coolant 108 remaining in the passages from spindle nozzles 43 and shower nozzles 45 after jet from spindle nozzles 43 and shower nozzles 45 is stopped.

Figure 2:
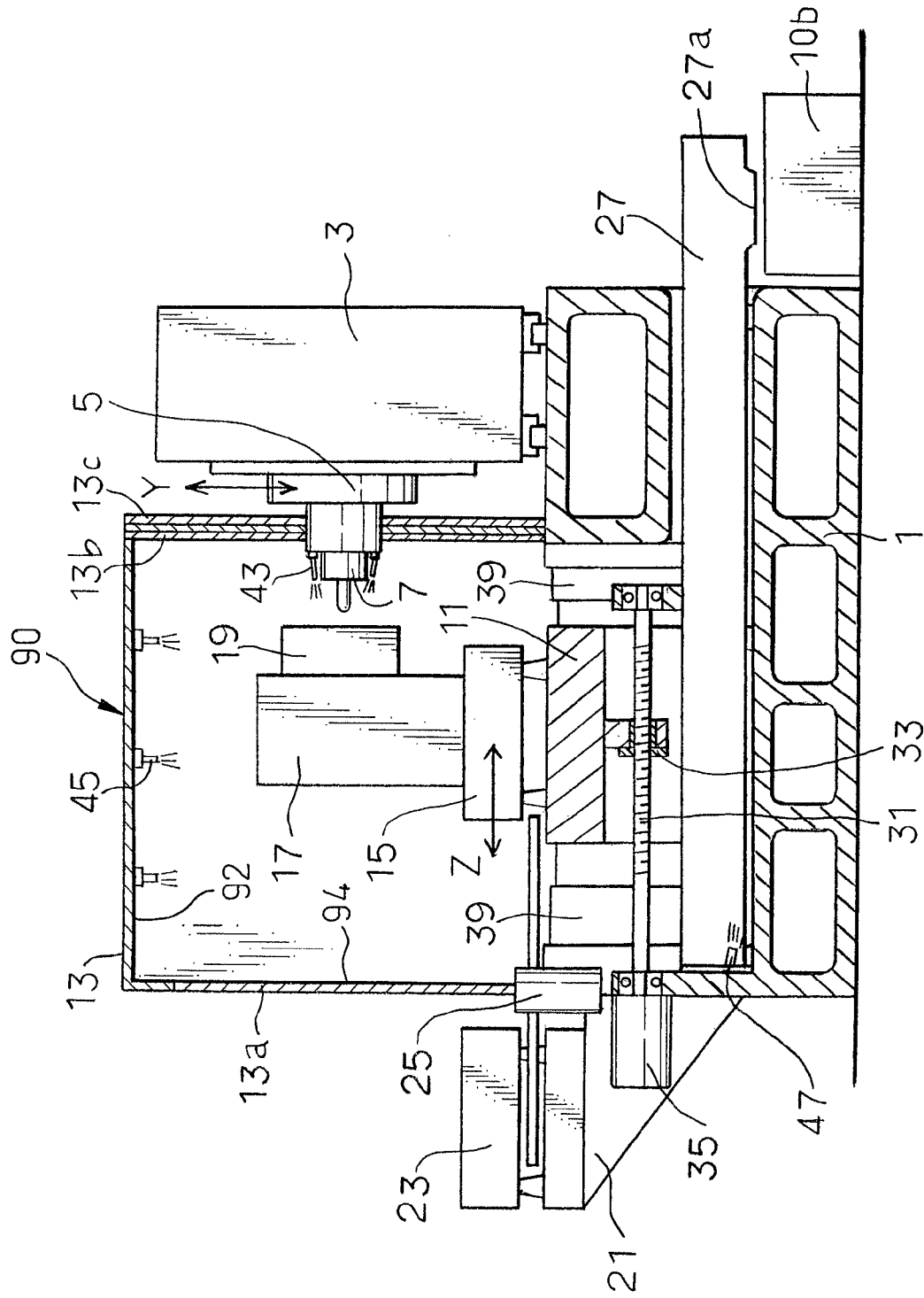
FIG. 2 is a cross-sectional view of a machine tool having the coolant supply apparatus illustrated in FIG. 1, viewed from the left-hand side.
Figure 3:
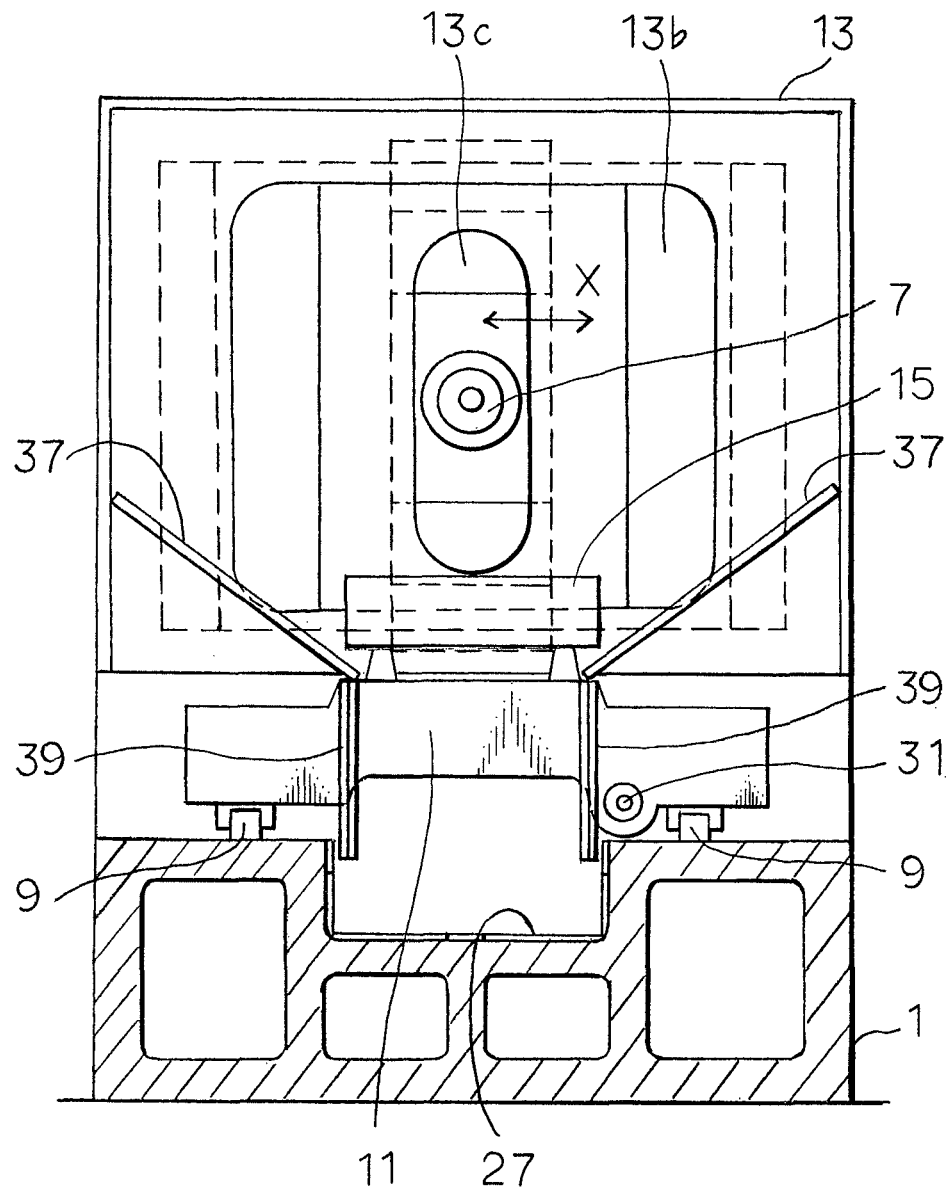
FIG. 3 is a cross-sectional view of the machine tool having the coolant supply apparatus illustrated in FIG. 1, viewed from the front.

Horizontal machining center 90 illustrated in FIGS. 2 and 3 will be described next. Horizontal machining center 90 includes bed 1, column 3 which linearly moves side to side (in the X-axis direction) along guides provided side by side on the top of a rear part of bed 1 that is one step higher than the rest of bed 1, spindle head 5 which linearly moves up and down (in the Y-axis direction) along guides provided vertically on the front face of column 3, spindle 7 which is rotatably built in spindle head 5 and has one end at which a tool is to be attached, table 11 which linearly moves forward and backward (in the Z-axis direction) along Z-axis guides 9, 9 provided on the top surface of a forward part of bed 1 in a longitudinal direction, and splash guard 13 which encloses a process area and prevents splatter of chips and coolant 108. Note that while horizontal spindle machining center 90 equipped with a coolant supply apparatus will be described as an example in the present embodiment, machining center 90 is not limited to this; the coolant supply apparatus of the present invention can also be provided for a machine tool such as a machining center that has a vertical spindle, a turning center, and a grinding center.

Pallet 15 is removably placed on table 11 and workpiece 19 is attached on pallet 15 via angle plate 17. Workpiece 19 is processed by relative movements of the tool at rotating spindle 7 and workpiece 19 in the X-, Y- and Z-directions.

Pallet platform 21 is attached to the front end of bed 1 and pallet 23 is placed on pallet platform 21 so that a processed workpiece can be removed and a workpiece to be processed next can be attached. Well-known swivel pallet replacement arm 25 is further provided on bed 1 between table 11 and pallet platform 21, and pallet 15 positioned in a pallet replacement position on table 11 is replaced with pallet 23 on pallet platform 21 by ascent/descent operations and swiveling of pallet replacement arm 25. Swivel door 13*a*, which constitutes the front side of splash guard 13, is provided on the axis of rotation of pallet replacement arm 25 and moves together with pallet replacement arm 25.

X-axis telescopic cover 13*b* and Y-axis telescopic cover 13*c* extend and contract according to linear movements in the X-axis and Y-axis directions of spindle head 5, and constitute the rear face of the splash guard 13. On the other hand, trough 27 having an angular U in cross-section is provided below table 11 in the center of the width of bed 1 along the longitudinal direction. Trough 27 is a member made from a metal sheet of which the front side is closed by a wall and the rear side is open. Trough 27 is attached in a recess of bed 1, receives chips and coolant 108 dropping from above, and allows the chips and coolant 108 to flow backward, thereby dropping and removing the chips and coolant 108 into dirty tank 106 through chute 27*a*. Trough 27 is secured through spacers made of a thermal insulating material provided at intervals so that trough 27 can be attached with an air layer between trough 27 and bed 1. This is consideration to preventing heat from heated coolant 108 from being transferred to bed 1. The smooth bottom of trough 27 slopes down toward the back to facilitate flow of chips with coolant 108.

Z-axis guides 9, 9 mentioned above are provided on bed 1 outside of the right and left of trough 27, and guide the linear movement in the Z-axis direction of table 11. In the present embodiment, one Z-axis feed screw 31 is provided in the vicinity of and inside of the Z-axis guide 9 on right side and outside trough 27, and is rotatably supported by bed 1, and nut 33 is provided on the bottom of table 11 to constitute a feed screw-nut mechanism. Z-axis feed screw 31 is driven to rotate by motor 35 provided at the front of bed 1. Z-axis guides 9, 9 and Z-axis feed screw 31 are covered, from the front side of splash guard 13 to the rear side of splash guard 13, with a matched pair of left and right tilted plate covers 37, 37 and Z-axis telescopic covers 39 provided at four locations, i.e. on the front, rear, left and right of the table in such a manner that Z-axis telescopic covers 39 can vertically extend and contract, thereby protecting Z-axis guides 9, 9 and Z-axis screw 31 from chips and coolant 108. Chips and coolant 108 are guided by splash guard 13, tilted plate covers 37, and Z-axis telescopic covers 39 to drop into trough 27.

Drum filter 102 (see FIG. 1) is built in dirty tank 106, and cleaned coolant 108 in clean tank 104 is recirculated by pump 100 (see FIG. 1) for recycling. A plurality of spindle nozzles 43, which are provided around spindle 7 at the front end of spindle head 5, have the function of jetting coolant 108 supplied from pump 100 toward a processing point, thereby cooling the tool and workpiece 19 and jetting chips away. A plurality of shower nozzles 45, which are provided on ceiling 92 of the splash guard 13, have the function of jetting coolant 108 supplied from pump 100 downward to jet away chips which would otherwise be accumulated on angle plate 17, table 11, tilted plate covers 37 and other components.

Trough nozzle 47 which jets coolant 108 supplied from pump 100 backward is provided at the front side of trough 27. A plurality of trough nozzles 47 may be provided at the front side of trough 27. Coolant 108 jetted from trough nozzle 47 with a predetermined pressure and flow rate forces chips in trough 27 to flow backward to drop into debris tank 106 through chute 27*a*. Coolant 108 is collected into debris tank 106 while the chips are removed to the outside of the lift-up chip conveyer with a scraper, not depicted.

A method for supplying coolant 108 to nozzles 43, 45, 47 will now be described by referring again to FIG. 1. Normal supply of coolant 108 will be described first. Normal supply of coolant 108 is performed by reading M08 code of a process program in NC unit 112 which controls machining center 90, and is terminated by reading M09 code. Coolant 108 delivered from pump 100 is supplied to spindle nozzles 43 and/or shower nozzles 45 through solenoid valves 136 while workpiece 19 is being processed, for example, while spindle 7 is rotating.

While workpiece 19 is not being processed, for example while spindle 7 is stopped, solenoid valves 136 switch to stop the supply of coolant 108 to spindle nozzles 43, and shower nozzles 45 and inverter circuit is controlled so that coolant 108 delivered from pump 100 is supplied only to trough nozzle 47 with a normal flow rate.

Jet supply of coolant 108 will be described next. Jet supply of coolant 108 is one of the functions for a process method selected especially when enhancement of the function of removing chips with coolant 108 is desired. Jet supply of coolant 108 is performed when M code of a process program (an auxiliary function of a program), for example, a jet coolant instruction assigned to M1736, is read out. The jet supply is also performed when M30 code, which indicates the end of a process program, is read out. When the jet coolant instruction is read out, the instruction is sent to the coolant supply apparatus and machine control unit 110 of the coolant supply apparatus opens only a particular coolant passage among the plurality of coolant passages and closes the other coolant passages so as to intensively supply coolant 108 only to the open passage at the maximum delivery rate of pump 100. Switching between open and close of the plurality of coolant passages is made by solenoid valves 136 turned on and off in response to an electrical signal from machine control unit 110.

Coolant 108 is jetted from jet nozzles 43, 45, 47 provided at an end of each of the coolant passages at the maximum delivery rate of coolant pump 100 for a predetermined period of time. For example, when coolant 108 is jetted only from spindle nozzles 43 of spindle nozzle coolant passage 120 at the maximum delivery rate, the X-, Y- and Z-axis positions of spindle nozzles 43 are determined so that spindle nozzles 43 are directed at workpiece 19 and a recess of a jig where chips tend to accumulate and coolant 108 is jetted, thereby reliably removing chips from the target area to prevent the tool from biting chips which would otherwise be wedged between the tool and a workpiece in the subsequent process. Further, when coolant 108 is jetted only from shower nozzles 45 of shower coolant passage 121 at the maximum delivery rate, chips attached or accumulated on the top surface of a workpiece, the top surface of pallet 15, side surface 94 of splash guard 13, the top surfaces of telescopic covers 39 and other parts can be reliably removed away into trough 27. Moreover, when coolant 108 is jetted only from trough nozzle 47 of trough coolant passage 122 at the maximum delivery rate, chips that have dropped in trough 27 provided in bed 1 in the working chamber can be removed away from the working chamber along the inclined surface of trough 27. Depending on the process conditions, jet supply of coolant 108 may be performed only from shower coolant passage 121 and trough coolant passage 122 without jetting from spindle nozzle coolant passage 120.

Jet coolant supply to filter backwash coolant passage 124 is performed by turning on a hard switch when the jet supply does not interfere with process work, for example, at the end of work every day. When the hard switch is turned on, machine control unit 110 causes motor 126 to slow down the rotation of drum filter 102 and, after a lapse of a predetermined period of time, coolant supply and the rotation of motor 126 are stopped.

Liquid temperature controller 114 stops operating when the temperature of coolant 108 in clean tank 104 reaches a predetermined temperature. When the temperature increases, liquid temperature controller 114 is activated. This operation is controlled by machine control unit 110. Liquid temperature coolant passage 123 is temporarily closed in response to a jet coolant instruction to jet coolant 108 to another passage even when the temperature of coolant 108 is high, in order to allow coolant 108 to intensively flow to that passage.

The invention claimed is:

1. A coolant supply apparatus supplying coolant to parts of a machine tool, the coolant supply apparatus comprising:
   a coolant pump delivering coolant from a coolant tank, an amount of the coolant to be delivered being variable;
   a plurality of branch passages allowing coolant delivered from the coolant pump to flow separately to a plurality of parts of the machine tool; and
   a control unit for turning on and off on-off valves of the plurality of branch passages,
   wherein the control unit, in response to a jet coolant instruction, opens a particular branch passage to supply coolant to the particular branch passage at a flow rate higher than a normal flow rate at which coolant is supplied to each particular coolant passage, and closes the other branch passages.

2. The coolant supply apparatus according to claim 1, wherein the control unit, in response to the jet coolant instruction, supplies coolant only to a coolant passage at an upper part of a working chamber for a predetermined period of time at the flow rate higher than the normal flow rate at which coolant is supplied to each particular coolant passage and then supplies coolant only to a coolant passage at a lower part of the working chamber for a predetermined period of time.

3. The coolant supply apparatus according to claim 1, wherein the plurality of branch passages comprise at least a shower coolant passage as a coolant passage at an upper part of the working chamber and at least a trough coolant passage as a coolant passage at a lower part of a working chamber.

4. The coolant supply apparatus according to claim 1, wherein at the flow rate higher than the normal flow rate, the coolant is supplied to the particular branch passage with a maximum delivery rate of the coolant pump.

* * * * *